United States Patent
DeWames et al.

(10) Patent No.: US 7,385,199 B2
(45) Date of Patent: Jun. 10, 2008

(54) MICROBOLOMETER IR FOCAL PLANE ARRAY (FPA) WITH IN-SITU MIRCO VACUUM SENSOR AND METHOD OF FABRICATION

(75) Inventors: Roger E. DeWames, Thousand Oaks, CA (US); James R. Waldrop, Thousand Oaks, CA (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 173 days.

(21) Appl. No.: 11/162,849

(22) Filed: Sep. 26, 2005

(65) Prior Publication Data

US 2007/0069133 A1    Mar. 29, 2007

(51) Int. Cl.
G01J 5/02        (2006.01)
(52) U.S. Cl. .................................. 250/340; 250/352
(58) Field of Classification Search ................. 350/300, 350/352, 339.02, 339.09, 340
See application file for complete search history.

(56) References Cited

U.S. PATENT DOCUMENTS 5,729,019 A * 3/1998 Krafthefer et al. .......... 250/353
5,801,383 A * 9/1998 Wada et al. ................. 250/332
6,453,748 B1 * 9/2002 Pryor ........................... 73/727
2005/0135724 A1* 6/2005 Helvajian et al. ............ 385/14
2005/0176179 A1* 8/2005 Ikushima et al. ........... 438/125

* cited by examiner

Primary Examiner—David Porta
Assistant Examiner—Carolyn Igyarto
(74) Attorney, Agent, or Firm—Koppel, Patrick, Heybl & Dawson

(57) ABSTRACT

A microbolometer IR FPA is provided with in-situ vacuum sensing capability by realizing that the IR sensor microbolometer pixel element itself may be used as a vacuum sensor. The application of an electrical signal to the resistive element heats the bolometer material thereby producing a variable resistance related to vacuum level. The degree of variability for a given material depends on the efficiency of heat transfer from the material to the surrounding environment. In a good vacuum, heat transfer is poor, and thus heat will be retained in the material to produce a relatively large temperature increase and the resistance variability will be large. In a poor vacuum, heat is readily transferred to the environment and the temperature rise will be relatively small and thus resistance variability will be small. Consequently, the variable resistance magnitude can be readout to determine the vacuum level.

21 Claims, 10 Drawing Sheets

MICROBOLOMETER IR FOCAL PLANE ARRAY (FPA) WITH IN-SITU MIRCO VACUUM SENSOR AND METHOD OF FABRICATION

This invention was made with Government support under Contract M67004-99-D-0037 awarded by the Department of Defense/Marine Corps. The Government has certain rights in this invention.

FIELD OF THE INVENTION

This invention relates to microbolometer IR focal plane arrays (FPAs) and more specifically to the integration of a micro vacuum sensor with the IR FPA.

DESCRIPTION OF THE RELATED ART

Infrared (IR) detectors are often utilized to detect fires, overheating machinery, planes, vehicles, people, and any other objects that emit thermal radiation. Infrared detectors are unaffected by ambient light conditions or particulate matter in the air such as smoke or fog. Thus, infrared detectors have potential use in night vision and when poor vision conditions exist, such as when normal vision is obscured by smoke or fog. IR detectors are also used in non-imaging applications such as radiometers, gas detectors, and other IR sensors.

Infrared detectors generally operate by detecting the differences in thermal radiance of various objects in a scene. That difference is converted into an electrical signal which is then processed to produce an output related to temperature differences in a scene. Three kinds of uncooled IR focal plane arrays (FPAs) have been developed including pyroelectric, thermopile and microbolometer. Microbolometers such as those typified by Oda et al. "Performance of 320× 240 Bolometer-Type Uncooled Infrared Detector" NEC Res. & Develop. Vol 44, No. 2, April 2003. pp 170-173 and U.S. Pat. No. 6,690,014 entitled "Microbolometer and method for forming" are infrared radiation detectors that are fabricated on a substrate material using traditional integrated circuit fabrication techniques. After fabrication, microbolometers are generally placed in vacuum packages to provide an optimal environment for the sensing device. The quality of the vacuum inside the package greatly affects the sensitivity of the detector, a high vacuum being necessary. Conventional microbolometers measure the change in resistance of a detector element after the microbolometer is exposed to thermal radiation. Microbolometers have applications in gas detectors, night vision, and many other situations.

Once the microbolometer IR detectors are to be used for a specific application they are vacuum packaged using chip-level or wafer-level techniques into very small packages. There is presently no commercially viable nondestructive way to monitor the vacuum integrity of a packaged microbolometer IR detector. Even the miniaturized vacuum gauges reviewed by Wilfert below are too large to place inside these packages along side the microbolometer arrays. As a result, there is no viable technique for identifying inadequate package vacuum conditions in production, monitoring subsequent changes in stored parts prior to fielding or monitoring subsequent changes in installed parts. Failure of package vacuum negatively impacts the reliability of the devices and ownership costs.

Wilfert and Edelmann, "Miniaturized Vacuum Gauges", J. Vac. Sci. Technol. A 22(2), March/April 2004, pp. 309-320 provide a review of selected miniaturized vacuum gauges based on pressure measuring principles and gauges used in conventional macrosystems. Specifically, they review the miniaturization of diaphragm, friction, thermal conductivity and ionization vacuum gauges. Although Wilfert and Edelmann find that modern production technologies of microelectronics, bulk micromachining, and thin-film deposition make it possible to reduce the dimensions of such vacuum gauges, these gauges have not as of yet been adopted for commercial implementation.

The paper specifically addresses a number of miniaturized thermal conductivity gauges, which use the pressure dependence of heat dissipation for the measurement of pressure. These gauges are generally of the Pirani type of floating polysilicon bridge or the thermopile type. Wang et al. "Thermal Micropressure Sensor for Pressure Monitoring in a Minute Package" fabricated a thermal microsensor by forming a titanium thin-film resistor on a floating nondoped silica glass membrane, with the sensing area being as small as 60 $\mu m \times 60$ $\mu m$. The sensor performance is raised by: (1) increasing the ratio of gaseous thermal conduction in the total thermal conduction by sensor structure design; (2) compensating the effect of ambient-temperature drift by using a reference resistor located close to the sensing element but directly on the silicon substrate; and (3) utilizing an optimized constant-bias Wheatstone bridge circuit. By choosing a proper bias voltage, the circuit extracts information on gaseous thermal conduction from the directly measurable total heat loss of the heated sensing element. The sensor is enclosed in a metal package.

SUMMARY OF THE INVENTION

The present invention provides an integrated microbolometer IR focal plane array (FPA) and vacuum sensor and method of fabrication suitable for high-volume commercial vacuum packages.

This is accomplished by realizing that the IR sensor microbolometer pixel element itself may be used as a vacuum sensor. The bolometer pixel can be used as a vacuum sensor because the application of an electrical signal to the resistive element heats the bolometer material thereby producing a variable resistance related to vacuum level. The degree of variability for a given material depends on the efficiency of heat transfer from the material to the surrounding environment. In a good vacuum, heat transfer is poor, and thus heat will be retained in the material to produce a relatively large temperature increase and the resistance variability will be large. In a poor vacuum, heat is readily transferred to the environment and the temperature rise will be relatively small and thus resistance variability will be small. Consequently, the variable resistance magnitude can be readout to determine the vacuum level.

In an exemplary embodiment, a microbolometer IR FPA comprises an array of bolometer pixels and at least one vacuum sensor on a substrate in a vacuum package. The bolometer pixels and vacuum sensor(s) each comprise a resistive element having material properties that change resistance in response to a change in the temperature of the material and a support structure that thermally isolates the resistive element from the substrate, typically by suspending it above the substrate. For imaging, a FPA ROIC (read out integrated circuit) on the substrate reads out the change in resistance of the pixels as a measure of IR radiation incident on the array. The sensitivity of the pixels to IR radiation is dependent upon the vacuum level in the package, a high vacuum being optimum. The vacuum sensor(s) is separately configured to receive an electrical signal that heats the material to a temperature that is a function of vacuum level and readout of a variable resistance that is a measure of the vacuum level.

The vacuum sensor(s) is integrally fabricated with the IR FPA on the substrate. The vacuum sensor and bolometer pixels have similar structural elements that can be fabricated concurrently on the same substrate. The mask set for the vacuum sensor may be configured to maximize thermal isolation to obtain maximum sensitivity to package vacuum level and to optimize heat radiation. The microbolometer detectors are configured to balance thermal isolation and response time and to optimize heat absorption.

In one embodiment, a sensor readout circuit, integrated on the substrate with the FPA ROIC or provided externally, measures a vacuum sensor resistance at a low electrical signal level to establish a reference resistance and then measures a variable resistance at a plurality of higher electrical signal levels, fits a heat transfer coefficient ($k_0$) to the variable resistance and looks up the corresponding vacuum level from a Pressure vs $k_0$ calibration curve. The calibration curve for a particular sensor geometry and material is determined by measuring I/V curves for the vacuum sensor for a plurality of vacuum levels, fitting to find a $k_0$ value for each I/V curve, and then fitting a pressure vs $k_0$ curve to the plurality of $k_0$ values. Other configurations for the sensor ROIC are possible including a Wheatstone bridge circuit.

These and other features and advantages of the invention will be apparent to those skilled in the art from the following detailed description of preferred embodiments, taken together with the accompanying drawings, in which:

DETAILED DESCRIPTION OF THE INVENTION

A microbolometer IR FPA is provided with in-situ vacuum sensing capability by realizing that the IR sensor microbolometer pixel element itself may be used as a vacuum sensor. The application of an electrical signal to the resistive element heats the bolometer material ("Joule heating") thereby producing a variable resistance related to vacuum level. The degree of variability for a given material depends on the efficiency of heat transfer from the material to the surrounding environment. In a good vacuum, heat transfer is poor, and thus heat will be retained in the material to produce a relatively large temperature increase and the resistance variability will be large. In a poor vacuum, heat is readily transferred to the environment and the temperature rise will be relatively small and thus resistance variability will be small. Consequently, the variable resistance magnitude can be readout to determine the vacuum level.

Figure 1A:
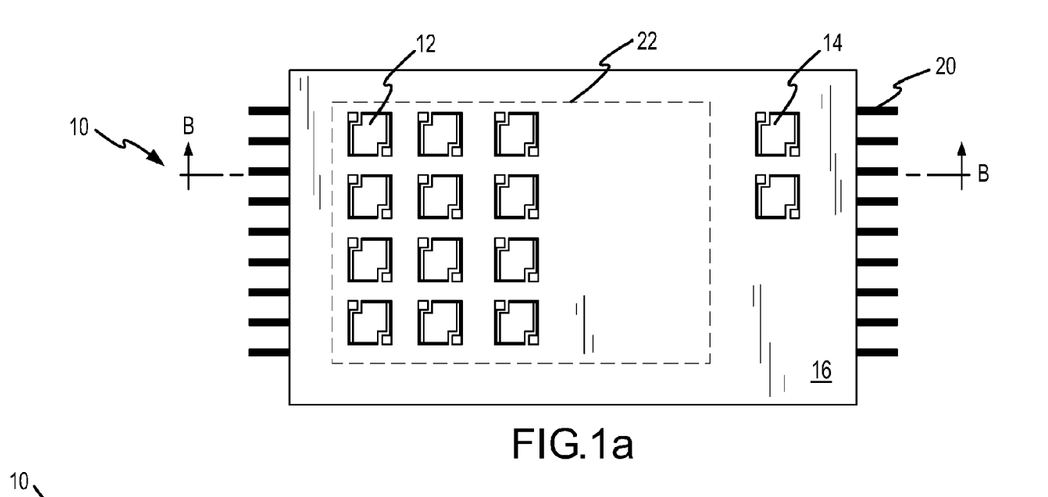
FIGS. 1a and 1b are simplified plan and section views of a microbolometer IR FPA with an integrated micro vacuum sensor in accordance with the present invention.
Figure 1B:
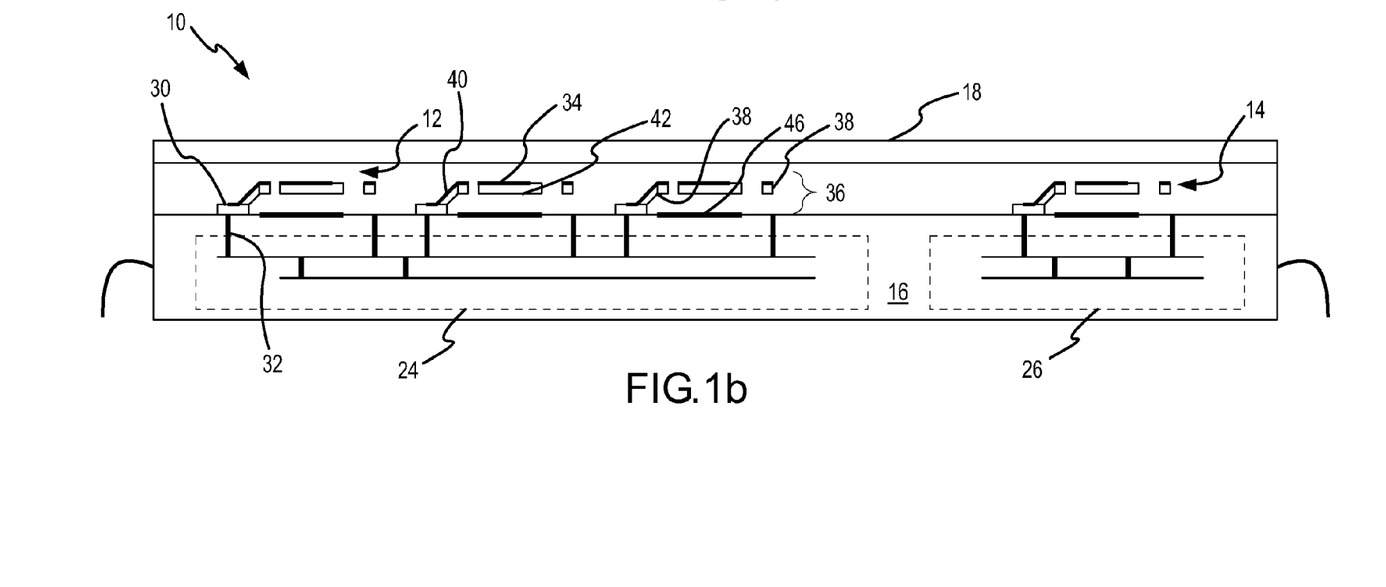
Figure 2A:
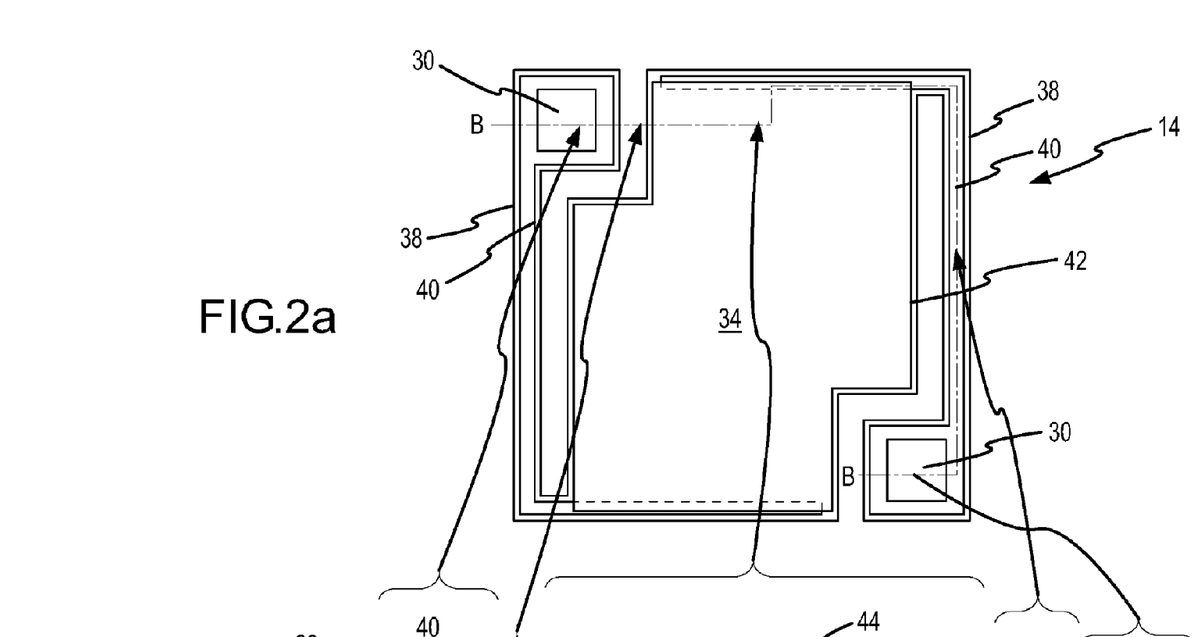
FIGS. 2a and 2b are plan and section views of a bolometer pixel or vacuum sensor.
Figure 2B:
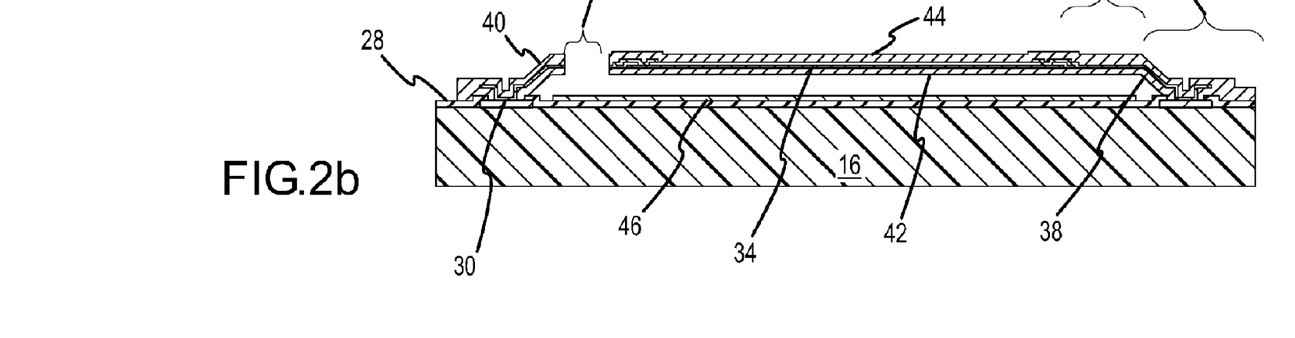

In an exemplary embodiment, a microbolometer IR FPA 10 including a vacuum sensor in accordance with the present invention is illustrated in FIGS. 1a-1b and 2a-2b. FIG. 1b is a view of the FPA through a simple horizontal section B-B shown FIG. 1a. FIG. 2b is a view on a single bolometer pixel through a serpentine section B-B shown in FIG. 1b to best illustrate the structure of the bolometer pixel and vacuum sensor.

Microbolometer IR FPA 10 comprises an array of bolometer pixels 12 and at least one vacuum sensor 14 on a substrate 16 in a vacuum package 18 having I/O pins 20. The bolometer pixels 12 lie within an IR window 22 to detect incident IR radiation. The vacuum sensor(s) 14 may lie either inside or outside of the window. The variation in sensor resistance caused by incident radiation is negligible compared to the variation that results from changes in vacuum level. Furthermore, in some applications the FPA may be shuttered at which time the vacuum sensor is shielded from IR.

The substrate 16 suitably comprises an IR FPA ROIC 24 and a vacuum sensor ROIC 26, and is prepared with a thin insulating layer 28 and metal pads 30 on which the bolometer pixels' and vacuum sensor(s) electrical/mechanical connections are established. Electrical vias 32 connect the pads 30 to the underlying ROICs. Alternately, one or both of the read out circuits can be provided externally.

The bolometer pixels and vacuum sensor(s) each comprise a resistive element 34 having material properties that change resistance in response to a change in the temperature of the material and a support structure 36 that thermally isolates the resistive element from the substrate, typically by suspending it above the substrate. Support structure 36 suitably has a pair of support legs, each suitably formed with a mechanical leg element 38 having material properties that are thermally insulating that suspends the resistive element above the substrate and an electrically conductive leg element 40 that provides an electrical connectivity path from pads 30 to resistive element 34. The support structure also includes a first support pad 42 having material properties that are thermally insulating connected between the mechanical leg elements 38 to support the resistive element 34 above the substrate. A second support pad 44 is preferably formed over the resistive element to provide rigidity and protection. The bolometer pixels also preferably include a reflector 46 on the substrate that forms a quarterwave resonant cavity to maximize infrared absorptance in the desired spectral band. The vacuum sensor may be formed with or without the reflector.

The support structure and resistive element for the bolometer pixels are typically configured to balance high thermal isolation, fast response time and high heat absorption from the incident IR radiation to optimize performance of the IR FPA. The thermal mass of bolometer affects the thermal isolation, response time, operating frequency, and sensitivity. By fabricating a bolometer with minimal thermal mass, high sensitivity and high operating frequency can be realized. Thermal isolation of the bolometer from substrate also affects the operating frequency and sensitivity. Thermal isolation of the resistive element from the substrate increases the sensitivity of the bolometer since less infrared radiation energy is necessary to raise the temperature of the resistive element. Thermal isolation also affects the operating frequency and response time of the bolometer since it affects the cooling rate of the resistive element. An increase in thermal isolation results in a corresponding decrease in cooling rate of the resistive element and, thus, a corresponding decrease in operating frequency of bolometer.

The geometry of the support structure and resistive element for the vacuum sensors may be configured identically to the bolometer pixels for ease of fabrication and still perform well. Alternately, the geometry may be designed to maximize thermal isolation without the constraints of response time or heat absorption. For example, the surface area of the support pad or the length or cross-section of the legs may be different.

Although the bolometer pixels and vacuum sensors are configured very similarly if not identically, they are used in very different ways. The bolometer pixels each detect a level of incident thermal radiation and together detect a thermal image. The vacuum sensor(s) monitor the vacuum level inside the vacuum package. The IR FPA ROIC 24 and the vacuum sensor ROIC 26 can be implemented in many different ways. In general, the IR FPA ROIC 24 is much more complicated due to the bandwidth requirements, sensitivity to changes in substrate temperature, SNR requirements to detect thermal images, and digital logic required to process pulsed image read out. In addition to the implementation complexity, the basic techniques for reading out a change in resistance as a measure of incident thermal radiation or vacuum level as illustrated in FIGS. 3a and 3b are very different.

Figure 3A:
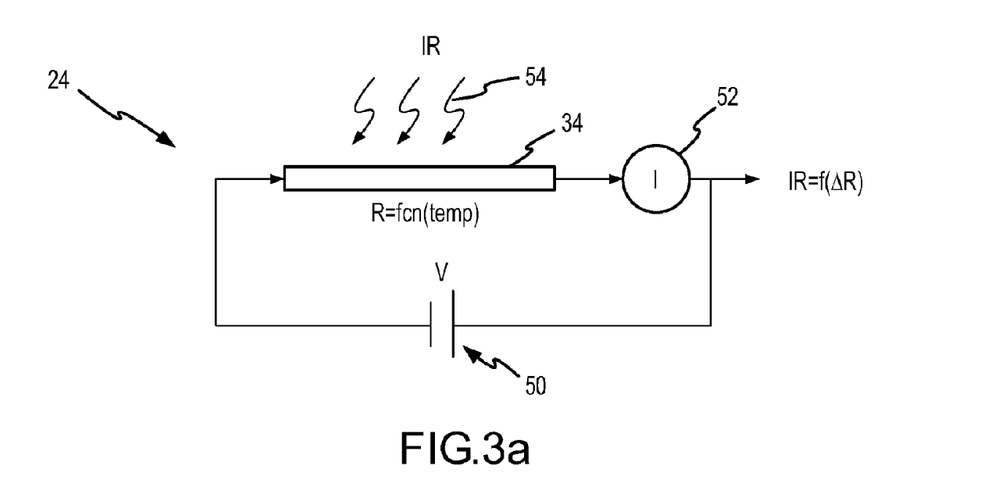
FIGS. 3a and 3b are functional block diagrams of the ROICs for the FPA and the vacuum sensor, respectively.

As illustrated in FIG. 3a, the IR FPA ROIC 24 provides a constant voltage 50 across the conductive leg elements and senses a change in electrical current 52 flowing through the resistive element 34. The magnitude of the change in electrical current varies with the amount of infrared radiation 54 detected. In an alternate embodiment, the ROIC provides a constant electrical current flowing through the resistive element and senses a change in the voltage across the conductive leg elements. In either case, the measured radiation is a function of $\Delta R$, which in turn is function of temperature, which in turn is a function of the incident radiation on the resistive element. The sensitivity of the pixels to IR radiation is dependent upon the vacuum level in the package, a high vacuum (low pressure) being optimum.

Figure 3B:
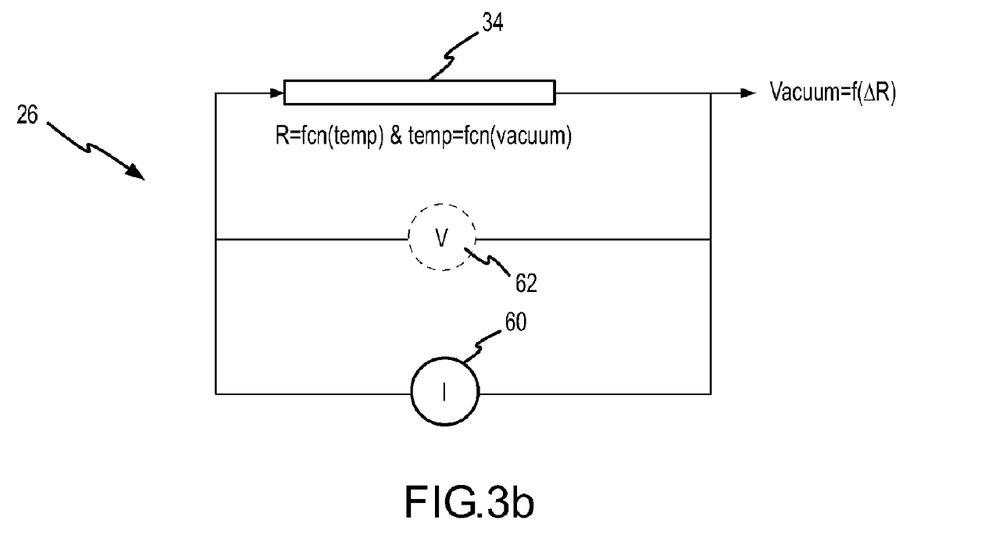

As illustrated in FIG. 3b, the vacuum sensor ROIC 26 supplies a current signal 60 that heats the resistive element 34 to a temperature that is a function of vacuum level and senses a change in voltage 62 across the sensor. The magnitude of the change in voltage (or resistance) is a measure of the vacuum level. The degree of variability for a given resistive material depends on the efficiency of heat transfer from the material to the surrounding environment. In a good vacuum, heat transfer is poor, and thus heat will be retained in the material to produce a relatively large temperature increase and the resistance variability will be large. In a poor vacuum, heat is readily transferred to the environment and the temperature rise will be relatively small and thus resistance variability will be small. Consequently, the variable resistance magnitude can be readout to determine the vacuum level. Alternately, a voltage signal can be applied across the sensor and a variable current read out. In either case, the measured vacuum level is a function of $\Delta R$, which in turn is function of temperature, which in turn is a function of the vacuum level in the package.

The vacuum sensor(s) 14 is integrally fabricated with the bolometer pixels 12 on the substrate 16. Integral fabrication is needed to meet the size and cost constraints of commercial FPA packages. As described above, the vacuum sensor and bolometer pixels have similar if not identical structural elements that can be fabricated concurrently on the same substrate. The fabrication process described herein with reference to FIGS. 4a through 4g is based on the paper by N. Oda, Y. Tanaka, T. Sasaki, A. Ajisawa, A Kawahara and S. Kurashina, published in NEC Res. & Develop. Vol. 44, No. 2, April 2003. pp 170-173, which describes a monolithic process for fabricating a bolometer array on a Si ROIC. The mask set for the vacuum sensor may be configured to maximize thermal isolation to obtain maximum sensitivity and to optimize heat radiation. The microbolometer detectors are configured to balance thermal isolation and response time and to optimize heat absorption.

Figure 4A:
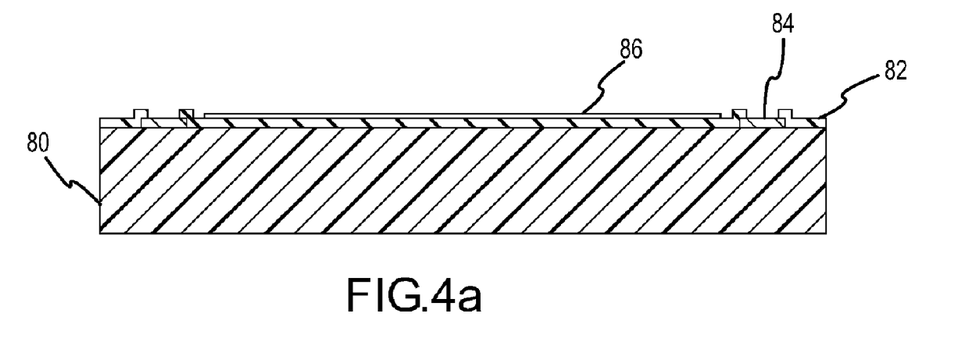
FIGS. 4a through 4g are sections of an exemplary fabrication process.

As shown in FIG. 4a, the substrate 80, suitably Si, SiC, GaAs, Ge or any other material that supports integration of semiconductor devices, including both the IR FPA ROIC and the vacuum sensor ROIC is prepared with a thin insulating layer 82, suitably a 0.1 to 10 um layer of $SiO_2$ and metal pads 84 at openings in the insulating layer on which the bolometer/sensor electrical/mechanical connections will be formed. An IR reflecting metal film 86, suitably Al, is deposited and delineated to eventually lie directly beneath the resistive element.

Figure 4B:
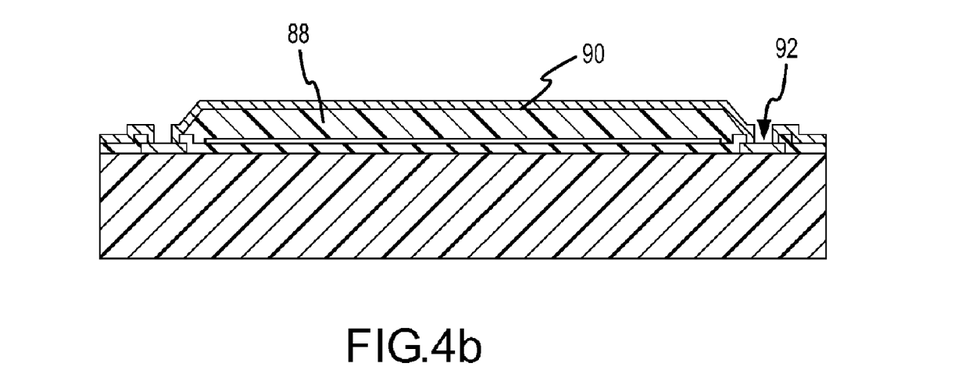

As shown in FIG. 4b, a sacrificial layer 88 of about 2 um thickness for detecting IR in the 8-12 um wavelength thermal radiation band is deposited on the wafer and openings, with sloped side walls, are made over the contact metal pads 84. A first dielectric layer 90, suitably 0.1 to 10 um thick, is deposited over the wafer and openings 92 are also made over the pads. Once etched, the first dielectric layer will form the mechanical leg elements and first support pad. The dielectric material should be both thermally and electrically insulating, low stress and self-supporting. $SiO_2$ and SiN are typical materials.

Figure 4C:
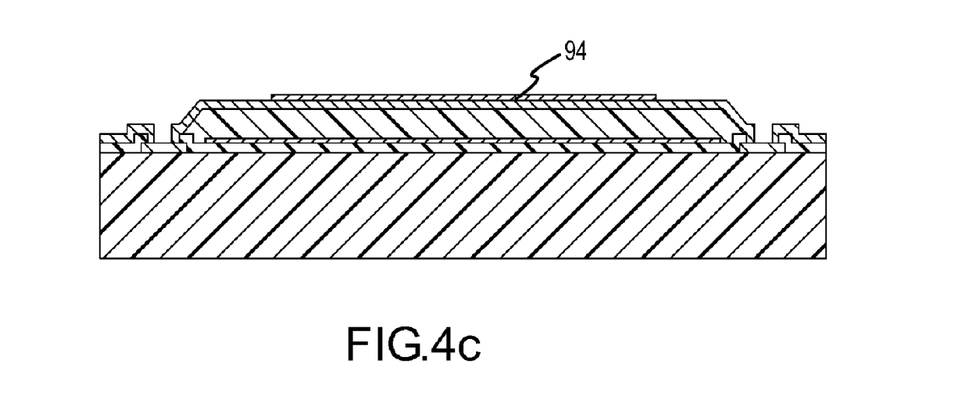

As shown in FIG. 4c, a Vanadium Oxide($VO_x$) thin film 94, suitably 0.01 to 0.2 um thick, or some other material such as Amorphous Silicon (a-Si) with large temperature coefficient of resistance (TCR), preferably at least 1% per degree Kelvin, is deposited and delineated to form the resistive element. At room temperature (300 K), $VO_x$, has a TCR of about 2% per degree Kelvin and a-Si has a TCR of about 2.7% per degree Kelvin. It is also desirable that the resistive material have a high sheet resistance in order to provide a relatively high sensor resistance in small pixel areas, e.g. 25 μm ×25 μm. With a high sensor resistance, a small input signal current can be used, which consumes less power. $VO_x$ has a sheet resistance of $10^3$-$10^5$ Ω/SQ.

Figure 4D:
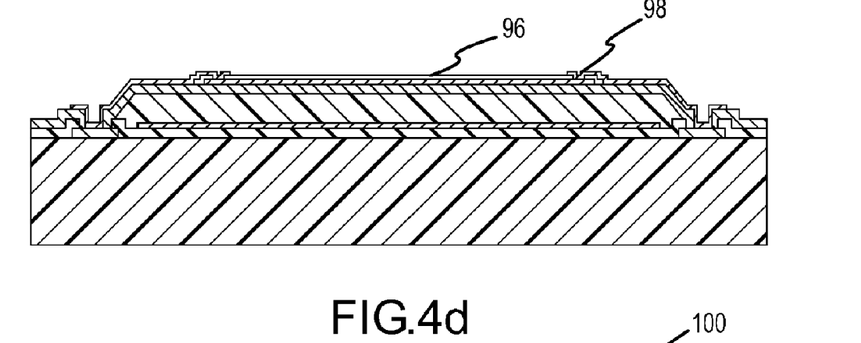

As shown in FIG. 4d, an insulating thin film 96, such as $SiO_2$ or $Si_3N_4$, is deposited and openings are made for contact to the $VO_x$ film. A contact metal thin film 98 e.g. Au or other suitable metals that form an Ohmic contact to layer 94, is deposited and delineated to form the conductive leg elements that connect the resistive element to the input ports of the ROIC via the metal pads. The metal film is preferably characterized by high electrical conductivity and low thermal conductivity.

Figure 4E:
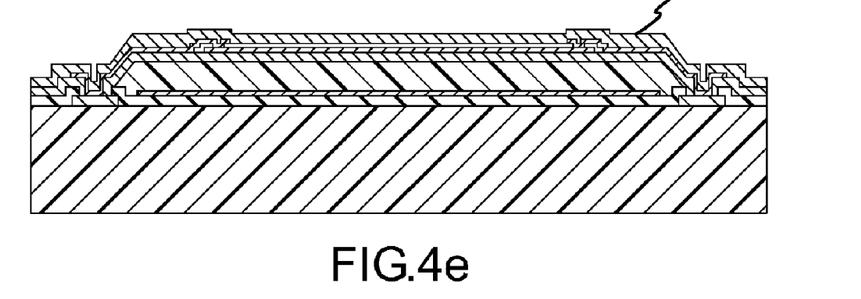

As shown in FIG. 4e, a second dielectric layer 100, suitably 0.05 to 1 um thick, is deposited over the wafer to provide rigidity to the structure and to protect the $VO_x$ thin film.

Figure 4F:
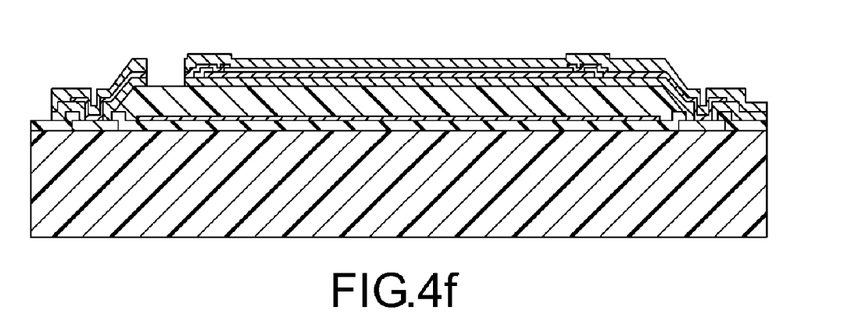
Figure 4G:
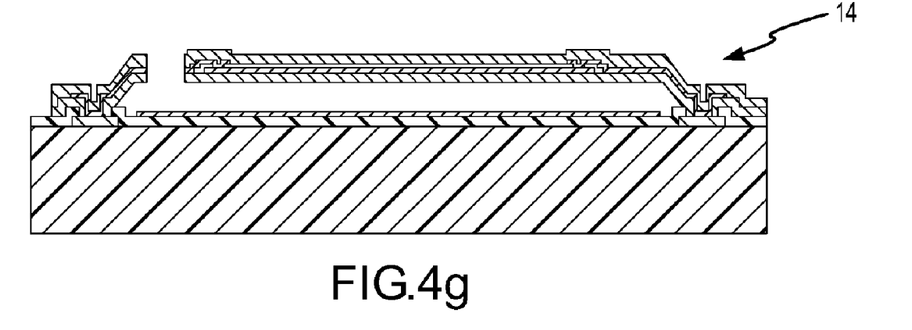
Figure 5:
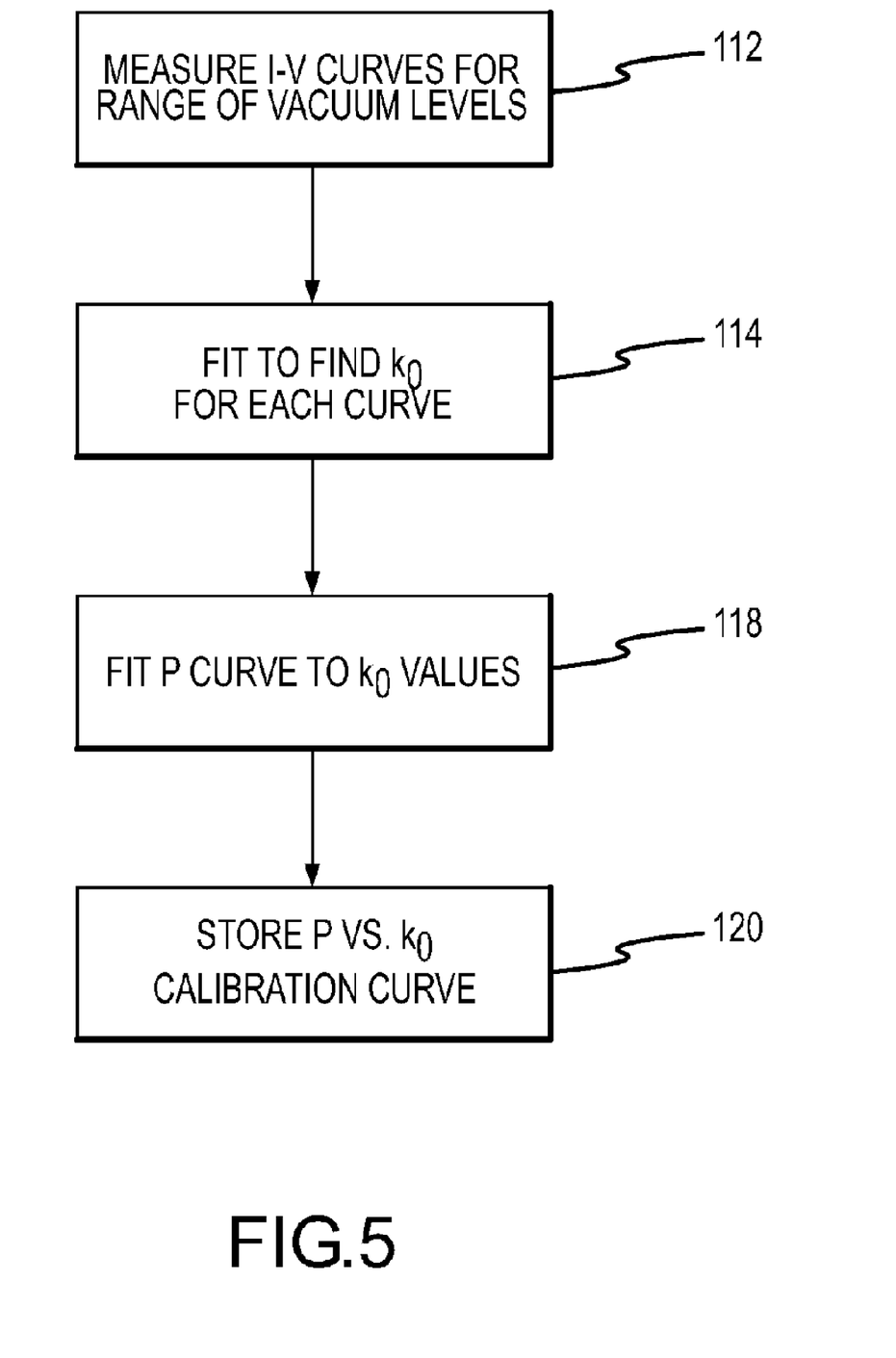
FIG. 5 is a flowchart of a process for calibrating the micro vacuum sensor.

As shown in FIG. 4f, the stack of layers making up the bolometer/sensor are delineated to the final geometry shown in FIGS. 2a and 2b.

As shown in FIG. 4f, sacrificial layer 88 is dry etched from underneath the bolometers/sensors to release them.

The vacuum sensor 14 and method of using the sensor to readout the vacuum level is based on relating a heat transfer coefficient $k_0$ to vacuum level. There may be many different techniques and circuits for generating the pressure (vacuum level) vs. $k_0$ curve and for measuring $k_0$ without departing from the scope of the invention. For example, a Wheatstone bridge circuit similar to that used by Wang could be used to measure $k_0$.

An embodiment of a method implemented by the vacuum sensor readout circuit is described with reference to FIGS. 5 through 8. The first step in the described embodiment is to calibrate the readout circuit to generate a P vs $k_0$ curve where P is the vacuum level and $k_0$ is a heat transfer coefficient. The calibration curve for a particular sensor geometry and resistive material is determined by measuring I/V curves 110 for the vacuum sensor for a plurality of vacuum levels (step 112), fitting to find a $k_0$ value for each I/V curve 110 (step 114), fitting a pressure curve 116 or 117 to the plurality of $k_0$ values (step 118) and storing the pressure curve 116 and/or 117 (step 120). The pressure curve can be stored in the ROIC or the external readout circuit.

Figure 6A:
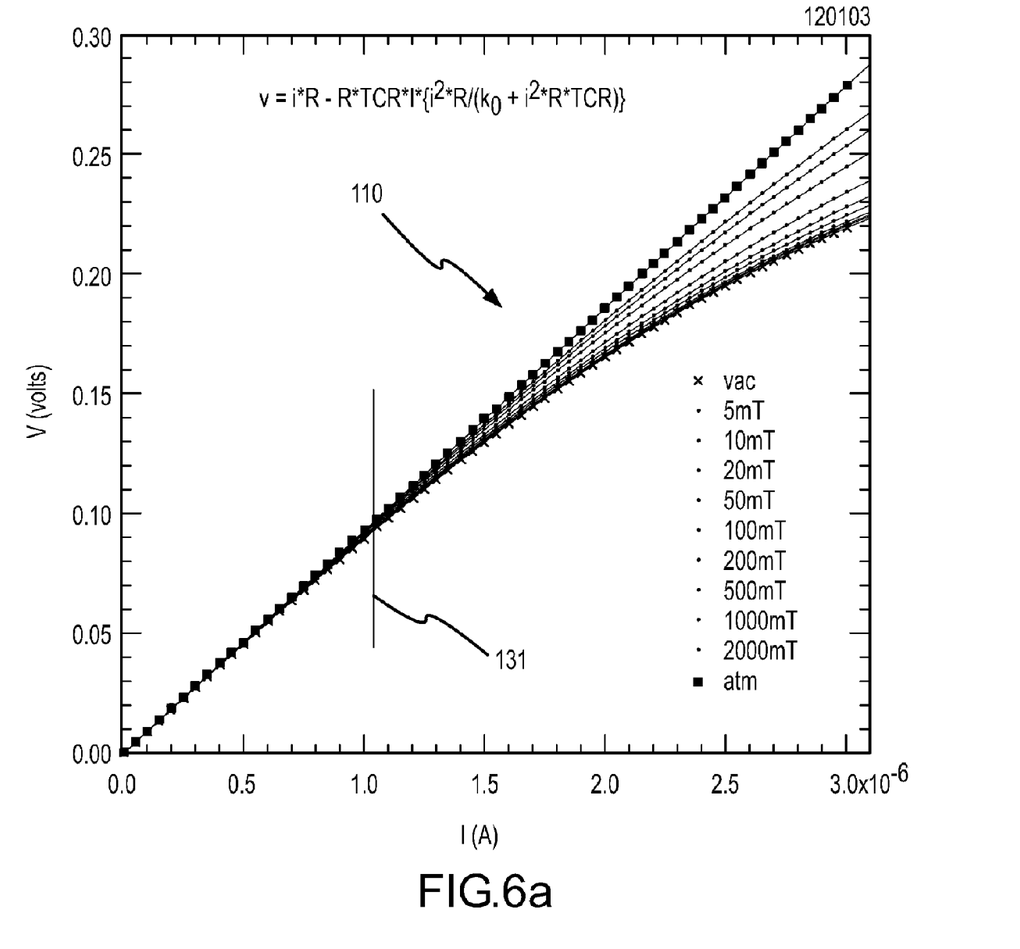
FIGS. 6a and 6b are I-V characteristic curves of the micro vacuum sensor at different vacuum levels.
Figure 6B:
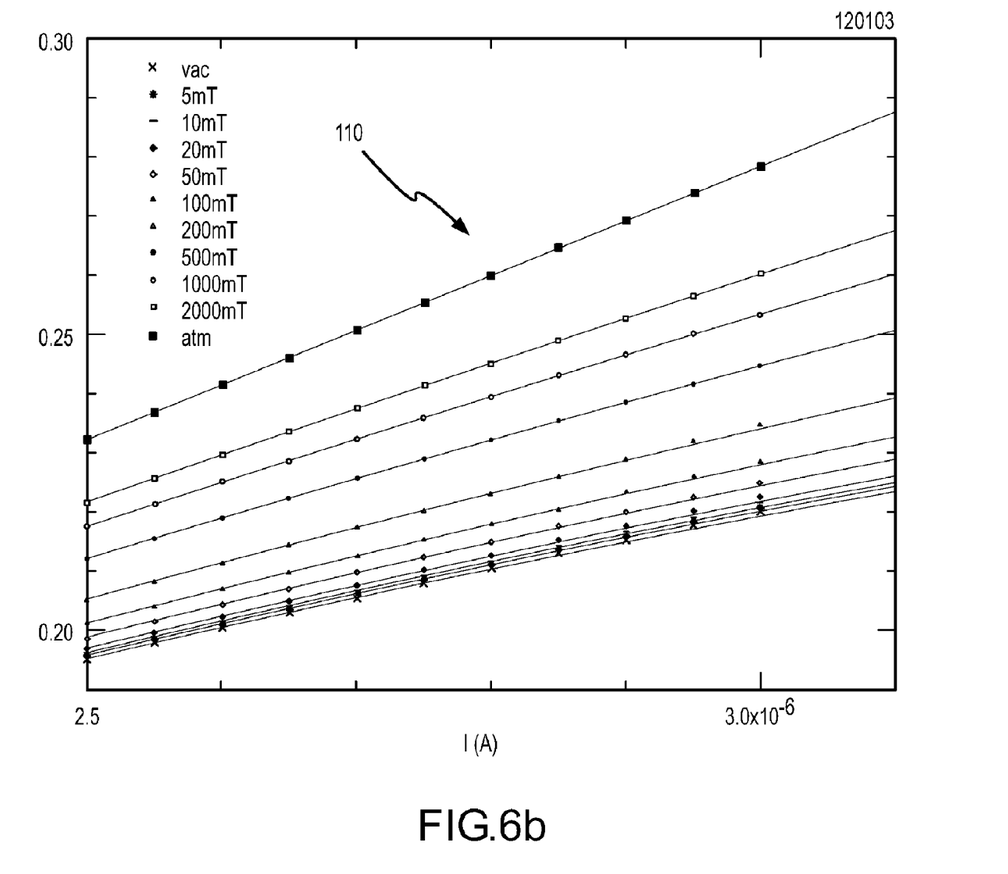

The particular I/V curves 110 and pressure curve 116 were generated for a 25 μm square sensor. As shown in FIGS. 6a and 6b, the $k_0$ values were fitted to each I/V curve according to:

$$v = i*R - R*TCR*I*(i^2*R/(k_0+i^2*R*TCR)) \quad (1)$$

where i is the input signal current, v is the measured voltage, R is the sensor resistance at the substrate temperature, e.g. 300 K for typical room temp, TCR=0.02 and $k_0$=ksensor+kambient. The only unknown being ksensor for a plurality of I/V curves. At low current levels where the Joule heating is negligible the resistance is not measurably a function of the vacuum level and appears constant. However, at sufficiently high current levels where Joule heating is appreciable the resistance is measurably affected by the vacuum level. At one extreme are pressure levels of at least 1 atm (760 Torr) at which essentially all the heat is transferred to the atmosphere and the sensor temperature does not rise. At the other extreme, in a perfect vacuum essentially all of the heat is retained and temperature increase is a maximum, hence the reduction in the sensor resistance is a maximum. With sufficient input power, the technique can work in vacuum levels less than one atmosphere. In practice, a "good" vacuum is typically <10T (≈1/80 of an atmosphere). Thus, for IR FPA packages that are supposed to have "good" vacuum, changes in resistance, hence degradation of vacuum can be measured at low power levels.

Figure 7A:
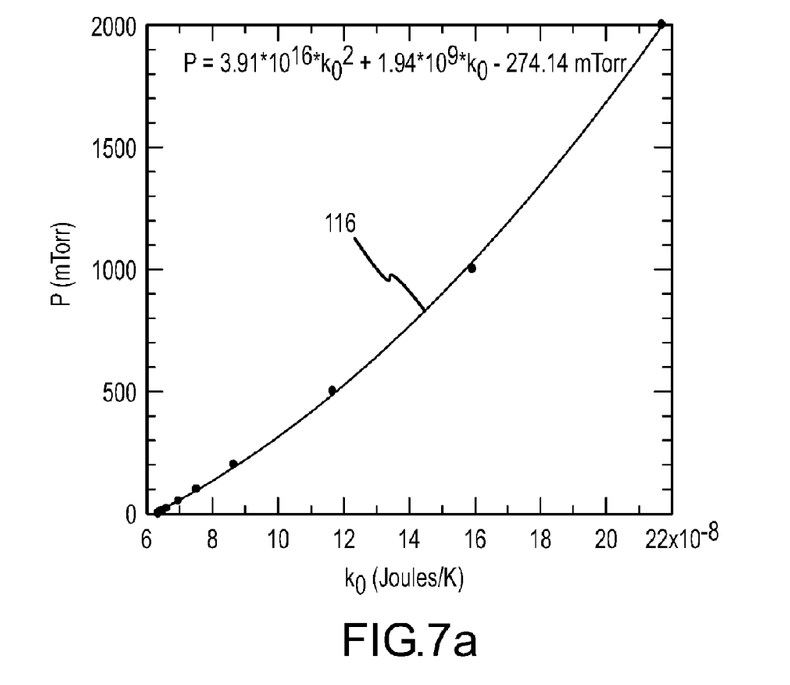
FIGS. 7a and 7b are calibration curves of pressure versus $k_0$.

As shown in FIG. 7a, a $2^{nd}$ order pressure curve 116 is fit to obtain the global $k_0$ values. The equation used to relate P (vacuum level) to $k_0$ is given by:

$$P = 3.91*10^{16}*k_0^{22} + 1.94*10^9*k_0 - 274.14 \text{ mTorr} \quad (2)$$

Figure 7B:
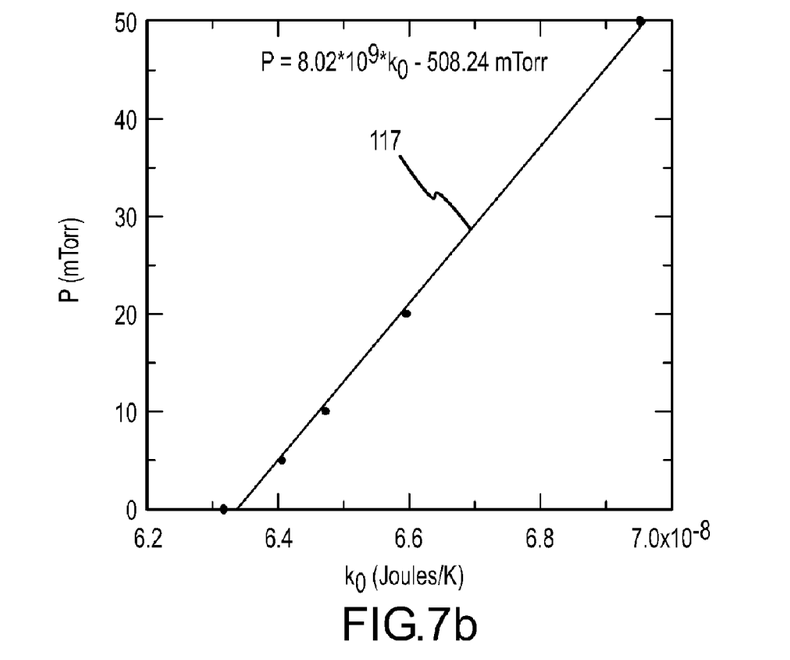

As shown in FIG. 7b, a $1^{st}$ order pressure curve 117 is fit to local $k_0$ values. The equation for computing P (vacuum level) from $k_0$ is then given by:

$$P = 8.02*10^9*k_0 - 508.24 \text{ mTorr} \quad (3)$$

Figure 8:
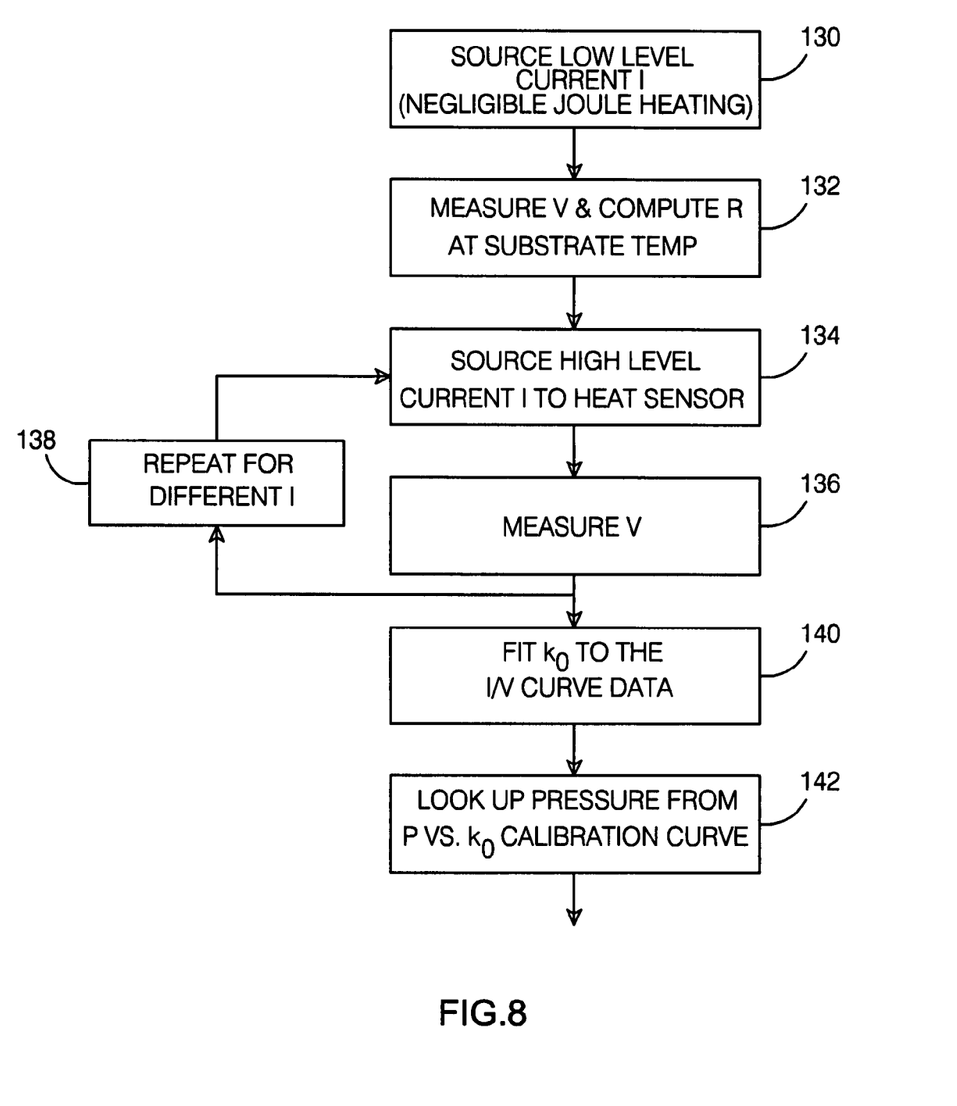
FIG. 8 is a flowchart of the process for measuring vacuum level using the micro vacuum sensor.

In an IR FPA package, the vacuum sensor ROIC (or external readout circuit) will periodically source a low level current I where Joule heating is negligible (step 130), suitably below a threshold 131, e.g. 1 μA in this example, and measure the voltage across the sensor (step 132) to establish a reference resistance R at the substrate temperature. Once R is established, the ROIC measures a variable resistance at a plurality of higher current levels (steps 134, 136 and 138) where Joule heating is appreciable to generate an I/V curve. The ROIC fits a value for $k_0$ to the I/V curve (step 140) and looks up the vacuum level from the Pressure vs $k_0$ calibration curve 116 or 117 (step 142).

If the readout circuit is integrated in the IR FPA package, no input pins are required to measure vacuum level. If the readout circuit is external then a pair of pins is required to apply the input signal current. The vacuum level may be readout as the actual value measured by the sensor. Alternately, the sensor ROIC may be configured to determine whether the vacuum level is within tolerance of a specified level and output a binary 0/1 indicating whether the IR FPA is working or not. In most applications, the vacuum level is monitored to simply determine whether the vacuum level is still good, and if not to take the FPA offline. However, it may be possible, either on chip or off, to use the measured vacuum level to recalibrate the IR FPA so it can produce usable information even in a degraded vacuum. This is probably only feasible for relatively small degradation and even at that such degradation will reduce the SNR of the IR FPA.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

What is claimed is:

1. A vacuum-packaged microbolometer IR focal plane array (FPA), comprising:
    a vacuum package;
    a substrate;
    an array of bolometer pixels on said substrate, said pixels having material properties that change resistance in response to a change in the temperature of the material, said pixels adapted to readout a change in resistance as a measure of IR radiation incident on said array, the sensitivity of said pixels being dependent upon maintaining a good vacuum level in the package; and
    at least one vacuum sensor on said substrate, said vacuum sensor having material properties that change resistance in response to a change in the temperature of the material, said vacuum sensor configured to receive an electrical signal that heats the material to a temperature that is a function of vacuum level and to readout a variable resistance of said sensor that is a measure of the vacuum level;
    wherein the bolometer pixels and said at least one said vacuum sensor each comprise:
    a resistive element suspended above the substrate, said resistive element having material properties that change resistance in response to a change in the temperature of the material; and
    a support structure having support legs coupled to suspend the resistive element above and in thermal isolation from the substrate, said support legs further providing electrical connectivity for the resistive element to receive an electrical signal and to readout the resistance;
    wherein the surface area of the at least one vacuum sensor's resistive element is different than the surface area of each bolometer pixel's resistive element.

2. The IR FPA of claim 1, wherein said vacuum package comprises an IR window for exposing the FPA to incident IR radiation.

3. The IR FPA of claim 1, wherein the support structure and resistive element for said bolometer pixels are configured to balance high thermal isolation, fast response time and high heat absorption from the incident IR radiation and the support structure and resistive element for said at least one vacuum sensor are configured for high thermal isolation.

4. A vacuum-packaged microbolometer IR focal plane array (FPA), comprising:
   a vacuum package;
   a substrate;
   an array of bolometer pixels on said substrate, said pixels having material properties that change resistance in response to a change in the temperature of the material, said pixels adapted to readout a change in resistance as a measure of IR radiation incident on said array, the sensitivity of said pixels being dependent upon maintaining a good vacuum level in the package; and
   at least one vacuum sensor on said substrate, said vacuum sensor having material properties that change resistance in response to a change in the temperature of the material, said vacuum sensor configured to receive an electrical signal that heats the material to a temperature that is a function of vacuum level and to readout a variable resistance of said sensor that is a measure of the vacuum level;
   wherein the bolometer pixels and said at least one said vacuum sensor each comprise:
     a resistive element suspended above the substrate, said resistive element having material properties that change resistance in response to a change in the temperature of the material; and
     a support structure having support legs coupled to suspend the resistive element above and in thermal isolation from the substrate, said support legs further providing electrical connectivity for the resistive element to receive an electrical signal and to readout the resistance;
   wherein the optimum thermal conductivity as determined by a combination of length and cross-section of the at least one vacuum sensor's support legs is different than the thermal conductivity of the bolometer pixel's support legs.

5. The IR FPA of claim 1, wherein the support legs comprise:
   a mechanical leg element that suspend the resistive element above the substrate, said mechanical leg element having material properties that are thermally insulating; and
   an electrically conductive leg element that provides an electrical connectivity path from the substrate to the resistive element.

6. The IR FPA of claim 5, wherein the support structure further comprises a first support pad having material properties that are thermally insulating connected between the support legs to support the resistive element above the substrate.

7. The IR FPA vacuum of claim 6, wherein the support structure further comprises a second support pad over the resistive element.

8. The IR FPA of claim 1, wherein the resistive element has a temperature coefficient of resistance (TCR) whose magnitude is at least 1% per degree Kelvin.

9. The IR FPA of claim 8, wherein the material for the resistive element is selected from Vanadium Oxide ($VO_x$) and Amorphous Silicon (a-Si).

10. The IR FPA of claim 1, further comprising a FPA readout integrated circuit (ROIC) in the substrate that applies an electrical signal to said bolometer pixels to readout the change in resistance as a measure of IR radiation incident on said array.

11. The IR FPA of claim 10, further comprising a vacuum sensor readout circuit that applies the electrical signal that heats the resistive element as a function of vacuum level and reads out the variable resistance as the measure of the vacuum level.

12. The IR FPA of claim 11, wherein the vacuum sensor readout circuit is located outside the package.

13. The IR FPA of claim 11, wherein the vacuum sensor readout circuit is a sensor ROTC in the substrate.

14. A vacuum-packaged microbolometer IR focal plane array (FPA), comprising:
   a vacuum package;
   a substrate;
   an array of bolometer pixels on said substrate, said pixels having material properties that change resistance in response to a change in the temperature of the material, said pixels adapted to readout a change in resistance as a measure of IR radiation incident on said array, the sensitivity of said pixels being dependent upon maintaining a good vacuum level in the package;
   at least one vacuum sensor on said substrate, said vacuum sensor having material properties that change resistance in response to a change in the temperature of the material, said vacuum sensor configured to receive an electrical signal that heats the material to a temperature that is a function of vacuum level and to readout a variable resistance of said sensor that is a measure of the vacuum level;
   wherein the bolometer pixels and said at least one said vacuum sensor each comprise:
     a resistive element suspended above the substrate, said resistive element having material properties that change resistance in response to a change in the temperature of the material; and
     a support structure having support legs coupled to suspend the resistive element above and in thermal isolation from the substrate, said support legs further providing electrical connectivity for the resistive element to receive an electrical signal and to readout the resistance;
   a FPA readout integrated circuit (ROIC) in the substrate that applies an electrical signal to said bolometer pixels to readout the change in resistance as a measure of IR radiation incident on said array; and
   a vacuum sensor readout circuit that applies the electrical signal that heats the resistive element as a function of vacuum level and reads out the variable resistance as the measure of the vacuum level, wherein the vacuum sensor readout circuit is a sensor ROIC in the substrate;
   wherein the sensor ROIC measures a plurality of resistances corresponding to a plurality of applied electrical signals, fits a $k_0$ value to those resistances and looks up the vacuum level from a Pressure vs $k_0$ calibration curve for the sensor, where $k_0$ is the heat transfer coefficient.

15. The IR FPA of claim 14, wherein the sensor ROIC first measures a vacuum sensor resistance at a low electrical signal level having negligible sensor heating and then measures a variable resistance at a plurality of higher electrical signal levels with sensor heating to fit the $k_0$ value to the variable resistance.

16. The IR FPA of claim 1, wherein the variable resistance is read out of the at least one vacuum sensor by relating a heat transfer coefficient $k_0$ to vacuum level.

17. A method of sensing IR radiation and vacuum level, comprising:

providing an IR focal plane array (FPA) vacuum package comprising an array of bolometer pixels and at least one vacuum sensor on a common substrate, said bolometer pixels and the at least one vacuum sensor having material properties that change resistance in response to a change in the temperature of the material;

reading out variable resistances for the array of bolometer pixels to measure a pattern of incident thermal radiation that heats the bolometer pixels;

applying an electrical signal to the at least one vacuum sensor to heat the sensor; and reading out a variable resistance for the at least one vacuum sensor to determine a vacuum level;

wherein the variable resistance for the at least one vacuum sensor is read out by:

measuring resistances for different values of the applied electrical signal;

fitting a heat transfer coefficient ($k_0$) to those resistances; and looking up the vacuum level from a Pressure vs $k_0$ calibration curve.

18. The method of claim 17, wherein the at least one vacuum sensor comprises a support structure that thermally isolates a resistive element having said material properties from a substrate, further comprising:

measuring a vacuum sensor resistance at a low electrical signal level; and measuring the variable resistance at a plurality of higher electrical signal levels to fit the k0 value to the variable resistance.

19. The method of claim 17, wherein the pressure (P) vs $k_0$ calibration curve is determined by:

measuring I/V curves for the at least one vacuum sensor for a plurality of vacuum levels;

fitting a $k_0$ value for each I/V curve; and fitting a pressure curve to the plurality of $k_0$ values.

20. The method of claim 17, further comprising declaring a pass or fail condition based on the vacuum level.

21. A method of sensing IR radiation and vacuum level, comprising:

providing an IR focal plane array (FPA) vacuum package comprising an array of bolometer pixels and at least one vacuum sensor on a common substrate, said bolometer pixels and the at least one vacuum sensor having material properties that change resistance in response to a change in the temperature of the material;

reading out variable resistances for the array of bolometer pixels to measure a pattern of incident thermal radiation that heats the bolometer pixels;

applying an electrical signal to the at least one vacuum sensor to heat the sensor;

reading out a variable resistance for the at least one vacuum sensor to determine a vacuum level; and providing a recalibration signal for reading out the variable resistances for the bolometer pixels based on the vacuum level.

* * * * *

UNITED STATES PATENT AND TRADEMARK OFFICE
CERTIFICATE OF CORRECTION

PATENT NO. : 7,385,199 B2
APPLICATION NO. : 11/162849
DATED : June 10, 2008
INVENTOR(S) : Roger E. DeWames and James R. Waldrop

It is certified that error appears in the above-identified patent and that said Letters Patent is hereby corrected as shown below:

- Column 10, Claim 13, Line 9, is written as: readout circuit is a sensor ROTC in the substrate." It should read as: "readout circuit is a sensor ROIC in the substrate".

- Column 11, Claim 18, Line 29, is written as: "electrical signal levels to fit the k0 value to the variable". It should read as: "electrical signal levels to fit the $k_0$ value to the variable".

Signed and Sealed this

Third Day of November, 2009

David J. Kappos
*Director of the United States Patent and Trademark Office*